United States Patent [19]
De Servi et al.

[11] Patent Number: 5,173,525
[45] Date of Patent: Dec. 22, 1992

[54] FLOORING COMPRISING POLYACRYLIC MATRIX CONTAINING FINELY DIVIDED FERRITE PARTICLES

[75] Inventors: Sergio De Servi, Carugo; Angelo L. Spelta, Casalpusterlengo, both of Italy

[73] Assignee: Enichem Elastomeri S.p.A., Palermo, Italy

[21] Appl. No.: 485,036

[22] Filed: Feb. 26, 1990

[30] Foreign Application Priority Data

Mar. 2, 1989 [IT] Italy ................ 19624 A/89

[51] Int. Cl.$^5$ ................................ C08K 3/22
[52] U.S. Cl. ........................... 524/431; 524/548
[58] Field of Search ........... 524/547, 548, 551, 558, 524/401, 435, 413, 714, 785, 431

[56] References Cited

U.S. PATENT DOCUMENTS

| | | | |
|---|---|---|---|
| 4,650,834 | 3/1987 | Yagishita | 526/386 |
| 4,818,781 | 4/1989 | Yamakawa | 524/407 |
| 4,869,964 | 9/1989 | Mazany | 524/435 |

OTHER PUBLICATIONS

Fumiharu Kokubu et al, Chemical Abs., vol. 107, No. 20, p. 907, abstract No. 189307x, Anisotropic Composite Magnents.

*Primary Examiner*—Christopher Henderson
*Attorney, Agent, or Firm*—Hedman, Gibson & Costigan

[57] ABSTRACT

Vulcanized composite materials with an elastomeric, polyacrylic matrix and containing ferrite in the form of finely dispersed particles, which materials are endowed with physical and technological characteristics which make them suitable for the production of manufactured articles destined to the flooring of civil premises, of industrial premises, as well as of all of those premises which are designed to withstand conditions of intense traffic of both pedestrians and mechanical vehicles.

2 Claims, No Drawings

FLOORING COMPRISING POLYACRYLIC MATRIX CONTAINING FINELY DIVIDED FERRITE PARTICLES

The present invention relates to composite materials on the basis of acrylic elastomers and ferrite, as well as to their use in the production of manufactured articles for floorings in general and in particular for floorings destined to be exposed to very severe environmental and traffic conditions.

Composite material in which the dispersed phase is constituted by ferrite have already been described in technical literature, and they have been adopted in all of those applications in which the magnetic character of ferrite constitutes the essential and characterizing element of the manufactured articles produced from said composite materials. So, e.g., in the following patents: DE-14 64 613; EP 80,160; U.S. Pat. No. 2,959,832 and U.S. Pat. No. 4,022,701 the preparation routes and the uses are disclosed of composite materials in which a ferrite component is contained in an elastomeric matrix.

Such materials are generally identified with the name of "flexible permanent magnets".

Examples of specific uses are the bands adherent to a metal, used as sealing elements relatively to other metal surfaces against which said material can be brought to rest.

This is the case of the sealing gaskets for refrigerators and for other household electrical appliances, as well as of the gaskets for metal windows.

Another use at the industrial level is in the manufacture of labels destined to be applied to metal surfaces of manufactured articles.

In all of these uses the adhesion of the gasket, or of the label, to the metal surface, is made possible by the magnetic character of ferrite, a character which is usually increased at manufacturing time by means of an activation with an external magnetic field.

The present Applicant has surprisingly found now that, leaving aside the magnetic character of ferrite, this latter can be used as a reinforcer material in special polymeric, crosslinking polymeric compositions based on a polyacrylic matrix, as specified hereinunder, with composite manufactured articles being obtained after vulcanization, which are characterized by high stiffness and high hardness values, together with further peculiar characteristics, as defined hereinunder (reference is made to the Examples attached hereto), which render the product a particularly suitable one for the production of manufactured articles for floorings in which the flexibility claimed by the prior patents constitutes a disturbing element, in that high characteristics of stiffness and hardness are required.

More particularly, ferrite in a very finely subdivided form is incorporated in an elastomeric matrix mainly constituted by an acrylic polymer, possibly in mixture with further resins, such as, e.g., epoxy resins, and containing additive agents performing the function of lubricants, of crosslinking accelerator agents and/or of inert fillers, besides further optional polymeric fillers generally constituted by such polyolefins as polyethylene or fluorinated polymers endowed with lubricating activity.

The acrylic polymer constituting the polymeric base of the composite materials is a copolymer deriving from the copolymerization of two or more monomers selected from the group constituted by:

(a) alkyl acrylates of formula:

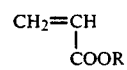

in which R is a linear or branched alkyl radical; examples of such monomers are ethyl acrylate, propyl acrylate, butyl acrylate, hexyl acrylate;

(b) alkoxyalkyl acrylates or thioalkoxyalkyl acrylates of formula:

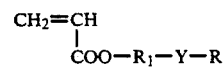

in which $R_1$ and R are two alkyl radicals and Y can be an oxygen atom or a sulfur atom; meaningful examples of such monomers are methoxyethyl acrylate, methoxypropyl acrylate and ethoxyethyl acrylate.

(c) olefinic monomers such as ethylene, propylene, butene-1, hexene-1 and octene-1; and (d) functional monomers susceptible of being copolymerized with the hereinabove mentioned monomers and having the structures:

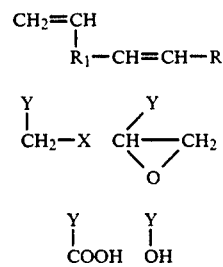

wherein R and $R_1$ have the hereinabove seen meaning; Y is an organic structure containing an unsaturation and susceptible of being copolymerized with the hereinabove seen acrylic monomers; X is a halogen atom.

The presence of these functional groups in the polymeric matrix of the composite material is strictly tied to the possibility of crosslinking the same polymeric matrix, with a vulcanized polymer endowed with high characteristics of stiffness and of hardness being obtained. These functional groups are generally in the form of substituents of the alkyl radical R in the acrylic monomers of the hereinabove seen type. This is the case of glycidyl acrylate,

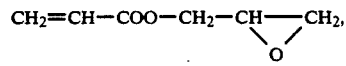

of hydroxyethyl acrylate, of hydroxypropyl acrylate and so forth, or they are linked to different monomeric structures such as allyl-glycidyl-ether, 2-chloroethylvinyl-ether, 2-bromoethyl-vinyl-ether.

The amounts of such monomeric units, containing a large enough amount of functional groups in order to secure an optimal crosslinking density, are comprised within the range of from 0.5 to 10%, and preferably of from 0.5 to 5% by weight, relatively to the weight of the total polymer.

Preferred forms of elastomeric matrix for the purposes according to the instant invention are the polymers deriving from the copolymerization of one or more monomer(s) containing the hereinabove seen functional groups, in such an amount as to introduce into the end polymer a number of functional groups which is comprised within the hereinabove seen % ranges and with at least one monomer selected from the group consisting of the alkyl acrylates.

The acrylic structure can be formed as well by means of the copolymerization of an acrylate belonging to the hereinabove disclosed (a) group with one or more alkoxyalkyl derivatives selected from among those belonging to the (b) group and of monomer containing functional groups, in the hereinabove specified amount.

More generally, for the constitution of the polymeric matrix of the composite material at least one acrylic monomer belonging to the (a) group is copolymerized with one or more monomers containing (d) functional groups in the presence of one or more (b) alkoxyalkyl acrylate(s) and/or one or more (c) olefin(s), with the ratios by weight of the amounts of the functional monomers to the remainder portion of monomers being such that in the resulting polymer the former do not constitute more than 10% and preferably not more than 5% of the total polymeric structure.

To the above disclosed acrylic polymer, obtained according to the usual methods of radical type copolymerization, well known to those skilled in the art, either alone or in mixture with other resins, such as, e.g., epoxy resins, a small amount, of the order of a few parts per hundred parts of a different polymer, such as a polyolefin, polyfluoroolefin, or another fluorinated polymer, can be optionally added in order to act as an additive and a reinforcer agent.

The end composite material is obtained by mixing with one another the acrylic elastomer or a mixture thereof with other resins and the optional additive polymer with possible further additives, inert fillers and ferrite in the desired proportions.

Among the important additives for the purposes of the present invention there are the vulcanization accelerator agents constituted by polyamines, diamines, tertiary amines, thioureas, quaternary ammonium salts, peroxides, sulfur, metal oxides, alkali-metal salts of fatty acids, phosphonium salts, and so forth.

In order to facilitate the mixing process, lubricants can be used in amounts of up to 15 parts by weight, as referred to 100 parts of elastomer, even if their use is not strictly necessary.

The ferrite used as the inorganic filler is defined by the following formula:

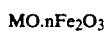

$MO.nFe_2O_3$ wherein M=barium, lead or strontium and n is an integer.

Each one of these compounds can be used either as a single compound, or in mixture with the other compounds without any limits of qualitative and quantitative composition.

The size of the particles of ferrite can be comprised within the range of from 0.5 to 10 microns. Ferrite can constitute up to 97% of the composite material, with the residual 3% comprising the acrylic rubber and the possible additives.

For the purposes of the instant invention, the best results are obtained when ferrite content in composite material is comprised within the range of from 75 to 95%, and preferably of from 80 to 90% by weight, relatively to the weight of the composite material.

A mixing of the various components can be carried out according to the techniques well known to those skilled in the art. In general, mixers of Banbury type, rotary mills, roll mixers, extruders, and so forth, are used.

The composite material owes its peculiar characteristics to the hereinabove mentioned use, after being submitted to vulcanization by heat, radiations or microwaves.

The crosslinking process which occurs thanks to the reactive groups contained in the elastomeric matrix makes it possible a material to be obtained, which is characterized by a combination of properties, among which: stiffness, hardness and abrasion strength.

The whole of the properties of the composite material after vulcanization is such as to make said composite material a particularly suitable one for the production of elastomeric flooring articles which can be used in order to coat floor foundations of several kinds and destined to withstand various traffic and environmental conditions.

The manufactured articles of vulcanized composite material, which, like the material they are constituted by, fall within the scope of the instant invention, are generally produced as sheets, square slabs or tiles of various sizes and structures, with a smooth surface or a relieved surface, of different colours or of one single colour. They can be furthermore constituted by one single layer of homogeneous material or by two or more layers superimposed and firmly united to each other, respectively destined to constitute the top walking/traveling portion of the flooring, and the underlying portion of said flooring.

Suitable premises for the application of the floorings according to the instant invention are both the civil premises destined to withstand moderate traffic conditions, prevailingly pedestrian traffic, such as, e.g., dwelling premises, offices, shops, school rooms, professional chambers, hospital wards and corridors, and so forth, and the industrial premises, designed to withstand conditions of relatively intense pedestrian traffic, as well as of traffic of vehicles with wheels with or without tires, such as processing rooms, laboratories, pavements, railway station platforms, carriage entrances, garage sheds, and so forth.

In general the manufactured articles (the square slabs, as well as the tiles) destined to be used for the floorings of the industrial premises, are constituted by one single layer of a homogeneous material endowed with suitable mechanical characteristics for better withstanding the relatively harder traffic conditions.

The preparation of the end manufactured articles is carried out by means of a process of fabrication of the composite material coming from the mixer (a Banbury mixer, rotary mills, roll mixers, extruders, and so forth) in order to produce bands, sheets, granules of various thicknesses according to the expected use, which are optionally coupled with bands of a same or of a different material, with the double-layer material as above mentioned being obtained. The end step consists of the transformation into square slabs, sheets or tiles, followed by the vulcanization step, which is usually carried out on a steam press or anyway by means of any other devices as normally used in the production of rubber floorings.

The following examples are reported for the purpose of better explaining the instant invention and are not to be construed as being in any way limitative of the same invention.

C. Mechanical properties of the composite material (as determined on specimens constituted by slabs compression-moulded for 25 minutes at 170° C.)

| Property | Unit of measure | Composite material | | | | | | Test Standard |
|---|---|---|---|---|---|---|---|---|
| | | I | II | III | IV | V | VI | |
| Tensile strength | MPa | 4.7 | 5.6 | 5 | 4.4 | 3.5 | 3.2 | ASTM-D412 (C) |
| Elongation at breakage | % | 125 | 60 | 70 | 90 | 150 | 170 | ASTM-D412 (C) |
| Hardness, Shore-A scale | | | | | | | | ASTM-D2240 |
| ■ reading after 3 seconds | points | 88 | 95 | 85 | 83 | 77 | 75 | |
| ■ reading after 30 seconds | points | 85 | 94 | | | | | |
| Hardness, Shore-D scale | | | | | | | | ASTM-D2240 |
| ■ reading after 3 seconds | points | 44 | 49 | | | | | |
| ■ reading after 30 seconds | points | 29 | 42 | | | | | |
| Hardness IRHD scale | points | 89 | 95 | | | | | ASTM-D1415 |
| Tearing | N/mm | 2.5 | 2.5 | | | | | ASTM-D624 |
| Abrasion | mm³ | 380 | 350 | | | | | DIN53516 |
| Permanent set under constant compression load (10 MPa) ■ 70 hours; 50° C. | % | 40 | 3 | | | | | ASTM-D395 |
| Impression test | % | 80 | 30 | | | | | UNI 5609 |

EXAMPLES

A. Components of the composite material

The following components were used:

(1) An acrylic elastomer constituted by Europrene AR153/EP, which is an ethyl acrylate copolymer with reactive monomers containing carboxy and epoxy groups.

(2) A ferrite, constituted by barium ferrite and characterized by a specific gravity of $\geq 3.5$ g/cm³ and by a particle size of $\leq 4$ μm (as determined by means of the Fischer method).

(3) A vulcanization accelerator agent, constituted by Arax B18, a masterbatch at 50% of octadecyltrimethyl-ammonium bromide.

The above ingredients were mixed by using a roll mixer at a temperature comprised within the range of from 30° to 40° C.

The accelerator agent, when used, was added by the end of the mixing step. The composites, except for composite material (I), were vulcanised on a steam press at a temperature of 170° C. for 25 minutes.

B. Compositions of the composite material (parts by weight)

| | I | II | III | IV | V | VI |
|---|---|---|---|---|---|---|
| Europrene AR153/EP | 100 | 100 | 100 | 100 | 100 | 100 |
| Ferrite | 900 | 900 | 733 | 575 | 445 | 400 |
| Arax B18 MB50% | | 1.5 | 1.5 | 1.5 | 1.5 | 1.5 |

D. Remarks

Vulcanization causes a considerable increases in the elastic properties as well as in the stiffness of the composite material.

So, if one compares the hardness of the composite material (II) to the hardness of the composite material (I), a rather considerable increase can be observed, above all for longer test times (e.g., the Shore hardness ShD at 30 seconds). That fact is due to an increase in the stiffness and in the elastic properties of the composite material.

The measurements of resistance to permanent set due to a compression load and the impression test demonstrate the considerable advantage which one obtains when the vulcanized composite material (II) is used. The permanent set test simulates the action of loads (by either goods or persons) operating by applying a compression load to the floor. More specifically, the impression test is orientated to tests in which compression loads are applied to small surface areas, as it occurs, e.g., in case of heels or umbrella's tips. In both cases, residual values of compression set are required. Which are as low as possible.

From the above tests the considerable improvement can be observed, which one can attain by means of the vulcanization of mixtures of polyacrylic elastomer and ferrite.

We claim:

1. A composite flooring material consisting essentially of a Europrene acryl elastomer; barium ferrite and a vulcanization accelerator agent comprising 50% of octadecyltrimethyl-ammonium bromide.

2. A composite flooring material as defined in claim 1 consisting essentially of about 100 parts by weight of said Europrene acryl elastomer; from about 900 to about 400 parts by weight of said ferrite; and about 1.5 parts by weight of said vulcanization accelerator agent.

* * * * *